(12) United States Patent
Tsai et al.

(10) Patent No.: US 7,573,618 B2
(45) Date of Patent: Aug. 11, 2009

(54) PAPER PRESSING DEVICE FOR A SCANNING APPARATUS

(75) Inventors: Chen-Tsai Tsai, Taipei (TW); Hsueh-Chou Hsu, Kaohsiung (TW); Tien-Ho Hsu, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 362 days.

(21) Appl. No.: 11/556,083

(22) Filed: Nov. 2, 2006

(65) Prior Publication Data
US 2007/0247676 A1 Oct. 25, 2007

(30) Foreign Application Priority Data
Apr. 19, 2006 (TW) ............................... 95114015 A

(51) Int. Cl.
*H04N 1/04* (2006.01)
(52) U.S. Cl. .................. 358/498; 358/496; 399/367
(58) Field of Classification Search ............ 358/496, 358/498, 474, 401, 501; 399/367, 374, 364; 355/23, 24; 271/225, 226, 3.14
See application file for complete search history.

(56) References Cited

U.S. PATENT DOCUMENTS

| 5,661,571 A * | 8/1997 | Ijuin et al. .................. 358/471 |
| 5,881,350 A | 3/1999 | Wada et al. |
| 2007/0223063 A1 * | 9/2007 | Liu et al. .................. 358/498 |
| 2008/0031667 A1 * | 2/2008 | Tsai et al. .................. 399/374 |
| 2008/0067736 A1 * | 3/2008 | Tsai et al. .................. 271/186 |
| 2008/0179819 A1 * | 7/2008 | Tsai et al. .................. 271/145 |

FOREIGN PATENT DOCUMENTS

JP        2002014495        1/2002

* cited by examiner

*Primary Examiner*—Cheukfan Lee
(74) *Attorney, Agent, or Firm*—Workman Nydegger

(57) ABSTRACT

A paper pressing device for a scanning apparatus is provided, which include a scanning module and a paper track corresponding to the scanning module, wherein the paper track is provided for a paper sheet passing through. The paper pressing device includes a film and a pressing block. The film is disposed on one side of the paper track opposite to the scanning module. The pressing block is disposed on one side of the film opposite to the scanning module and presses against the film for reducing the height of the paper track above the scanning module. When the paper sheet is passes over the scanning module, the paper pressing device presses the paper sheet for maintaining the paper sheet flat while being scanned.

6 Claims, 4 Drawing Sheets

PAPER PRESSING DEVICE FOR A SCANNING APPARATUS

CROSS-REFERENCE TO RELATED APPLICATIONS

This non-provisional application claims priority under 35 U.S.C. § 119(a) on Patent Application No(s). 095114015 filed in Taiwan, R.O.C. on Apr. 19, 2006, the entire contents of which are hereby incorporated by reference.

BACKGROUND OF THE INVENTION

1. Field of Invention

The present invention relates to a paper pressing device, and more particularly to a paper pressing device which is able to press the paper sheet by surface contact for maintaining a paper sheet flat while being scanned.

2. Related Art

Due to the development of business, demands of printers and scanners have been increasing rapidly. At present, the design of a printer or a scanner trends to include multiple functions, i.e., a multi-function peripheral (MFP) providing more than one functionality such as print, image scan, document fax, document copy, even card read, and so on. With the continuing development of MFP, the price of MFP is being reduced gradually due to the commercial competition, so that students and families in addition to companies or organizations have become users of the MFP.

For automatic paper feeding mechanisms of a scanner or an MFP, a narrow space is provided above the scanning module for a paper sheet passing through while the paper sheet passes over the scanning module. In order to obtain a favorable quality of scanning images under the high-speed movement of the paper sheet, a paper pressing mechanism is provided to press the paper sheet onto the surface of a transparent plate of the scanning module, for maintaining the paper sheet flat. Further, in order to perform color correction, a color reference slice is provided to be scanned by the scanning module, and then the scanning module captures the image of the color reference slice, and then corrects the image data of the paper sheet with the color and color level of the color reference slice as a correction reference.

FIG. 1 is a sectional view of a scanning apparatus with a paper pressing device in the prior art. The paper pressing device has a pressing plate 131 and a spring 132. The scanning apparatus has a first body 110 and a second body 120. A paper track 150 is formed between the first body 110 and the second body 120 for a paper passing through. The first body 110 is mainly the upper portion of the scanning apparatus and the second body 120 is mainly the lower portion of the scanning apparatus, in which a scanning module 121 is disposed on the second body 120. A transparent plate 122 is disposed on the second body 120 and located above the scanning module 121, wherein the transparent plate 122 is made of light transparent materials, such a glass or reinforced plastic. The pressing plate 131 is pivotally connected to the first body 110, and the spring 132 is provided for pushing the pressing plate 131 swiveling toward the transparent plate 122, so that the pressing plat 131 presses against the paper sheet which passes over the transparent plate 122, to maintain the paper sheet flat on the surface of the transparent plate 122. Thereby the paper sheet can be scanned by the scanning module 121 with a favorable optical condition and preventing the scanning quality from being negatively affected due to the paper sheet being wrinkled.

However, the paper pressing device in the prior art has the following disadvantages.

1. The flatness of the pressing plate 131 is poor and a deformation is more likely to occur when pressing plate 131 is manufactured.

2. A plurality of springs 132 is required to overcome the problems of poor flatness and deformation of the flattening plate 131, and it is difficult for the paper pressing device to generate a uniform forward pressure.

3. An exclusive color reference slice 123 has to be used to correct the image data of the paper sheet with the color and color level.

FIG. 2 is a sectional view of another scanning apparatus with a paper pressing device in the prior art. The paper pressing device is a film 241 made of plastic. The scanning apparatus has a first body 210 and a second body 220. A paper track 250 is formed between the first body 210 and the second body 220.

The first body 210 is mainly the upper portion of the scanning apparatus and the second body 220 is mainly the lower portion of the scanning apparatus, in which a scanning module 221 is disposed in the second body 220, and a transparent plate 222 is disposed on the second body 220 and located above the scanning module 221. The film 241 can be elastically deformed to press the paper sheet onto the transparent plate 222 for maintaining the paper sheet flat. However, the film 241 still has the following disadvantages.

1. An exclusive color reference slice has to be used to correct the image data of the paper sheet with the color and color level.

2. Since only the free end at the front edge of the film 241 contacts the paper, the film 241 presses the paper sheet by linear contact instead of surface contact, and thus it is difficult to effectively maintain the paper sheet flat on the transparent plate 222 to be scanned by the scanning module 221.

SUMMARY OF THE INVENTION

The paper pressing device in the prior art has poor performance for maintaining paper sheets flat, such that the paper sheet cannot be flattened onto the transparent plate be scanned by a scanning module to. In view of the above problem, the object of the present invention is to provide a paper pressing device which has simple structure, for maintaining paper sheets flat on the surface of a transparent plate to be scanned by a scanning module, to facilitate the scanning operation of the scanning module. Further, the present invention also has the function of a color reference slice, the whole structure of the scanning module can be simplified, thus effectively improving the scanning quality and also saving cost of manufacturing.

In order to achieve the above objective, the present invention provides a paper pressing device for a scanning apparatus. The scanning apparatus at least has a scanning module and a paper track, wherein the paper track is disposed to correspond to the scanning module for paper sheets passing through.

The paper pressing device includes a flexible film and a pressing block. The film is disposed on one side of the paper track opposite to the scanning module. The pressing block is disposed on one side of the film opposite to the scanning module and pressing against the film to reduce the height of the paper track above the scanning module, thus maintaining the paper sheets flat for passing paper onto the scanning module.

The present invention involves utilizing the film and the pressing block disposed in a scanning area for maintaining paper sheet flat onto the transparent plate to be scanned by the scanning module. The film presses the paper sheets by surface contact, thus maintaining the paper sheets flat onto the transparent plate. The pressing block provides a force for maintaining the paper sheet flat. Moreover, the pressing block in the present invention can be made of elastic materials such as sponge or foam for generating an elastic force for pressing against the film. The film can be made of plastic materials such as polyvinyl chloride (PVC).

The advantages of the present invention are that the scanning quality can be effectively improved while the structure of the paper pressing device is simplified. The structure of the paper pressing is simple and easy to be repaired, and a uniform pressing force can be provided for a long period, such that also paper jam can be avoided. Moreover, the function of a color reference slice can also be provided as a color correction reference, so that the structure of the paper pressing device is further simplified for reducing the cost of manufacturing.

The features and practice of the preferred embodiments of the present invention will be illustrated in detail below with the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
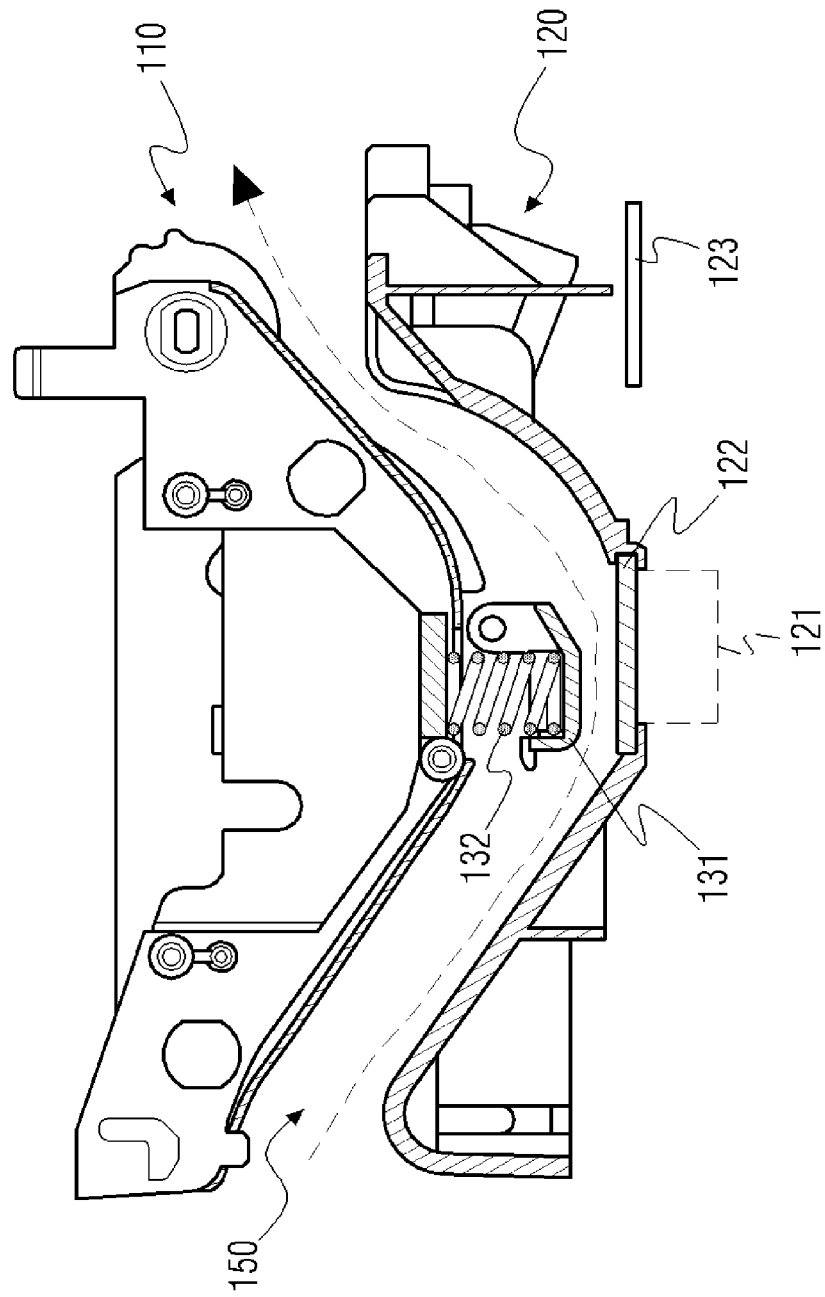
FIG. 1 is a schematic sectional view of the scanning apparatus with a paper pressing device according to the prior art.
Figure 2:
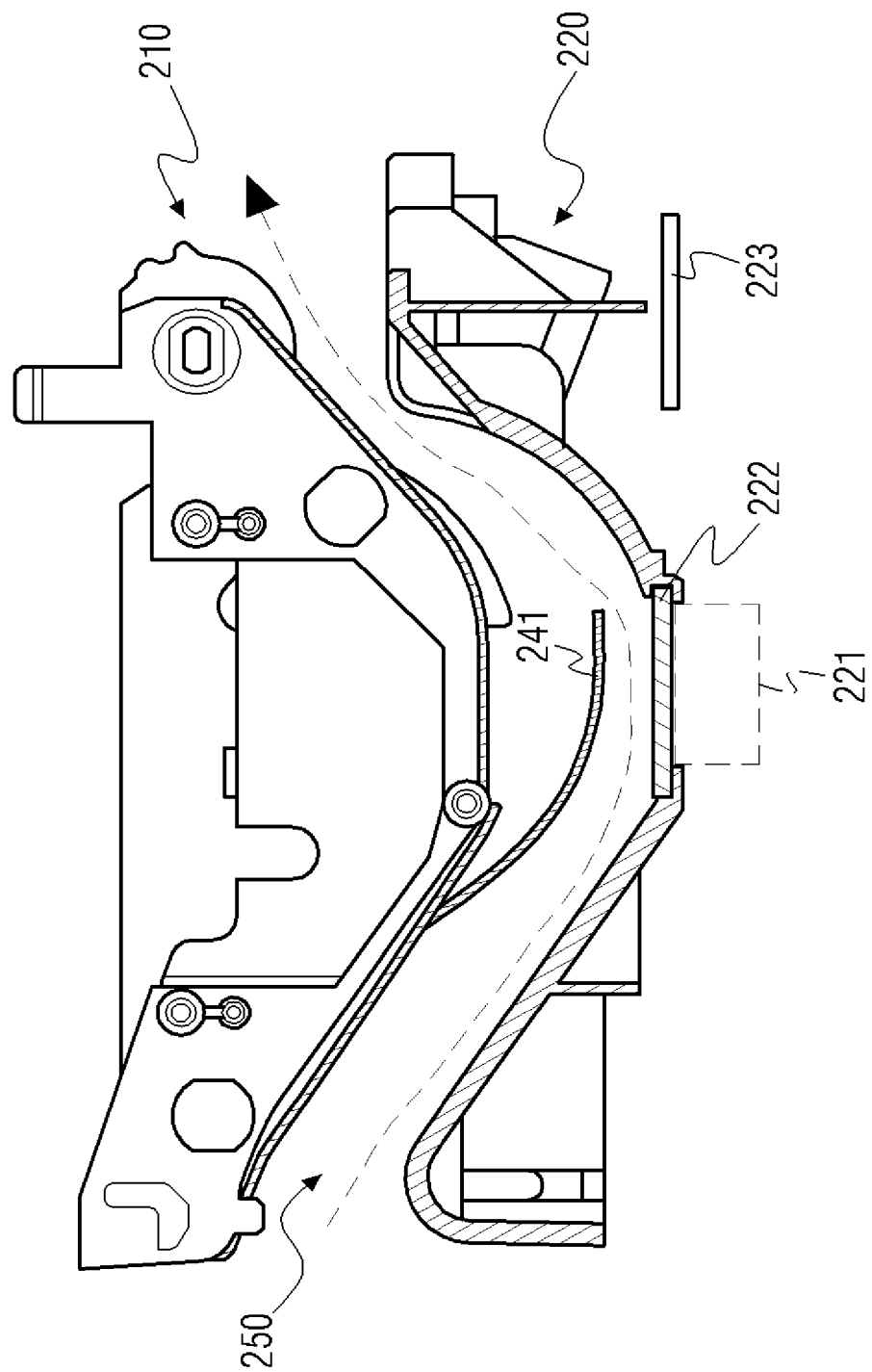
FIG. 2 is a schematic sectional view of the scanning apparatus with a paper pressing device according to another prior art.
Figure 3A:
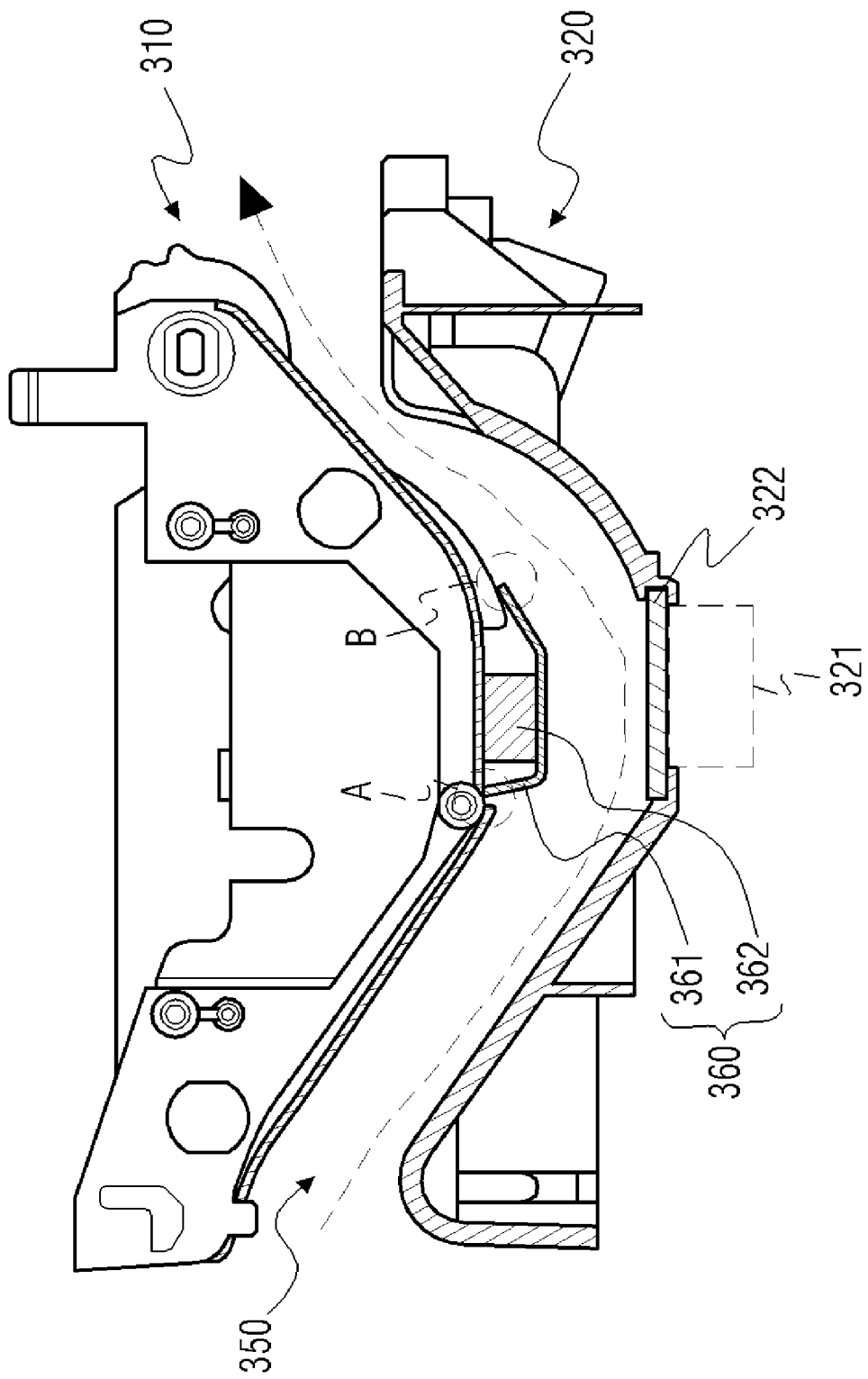
FIG. 3A is a schematic sectional view of the paper pressing device for a scanning apparatus before scanning according to an embodiment of the present invention.

FIG. 3A is a schematic sectional view of the paper pressing device 360 for a scanning apparatus before scanning according to an embodiment of the present invention.

Figure 3B:
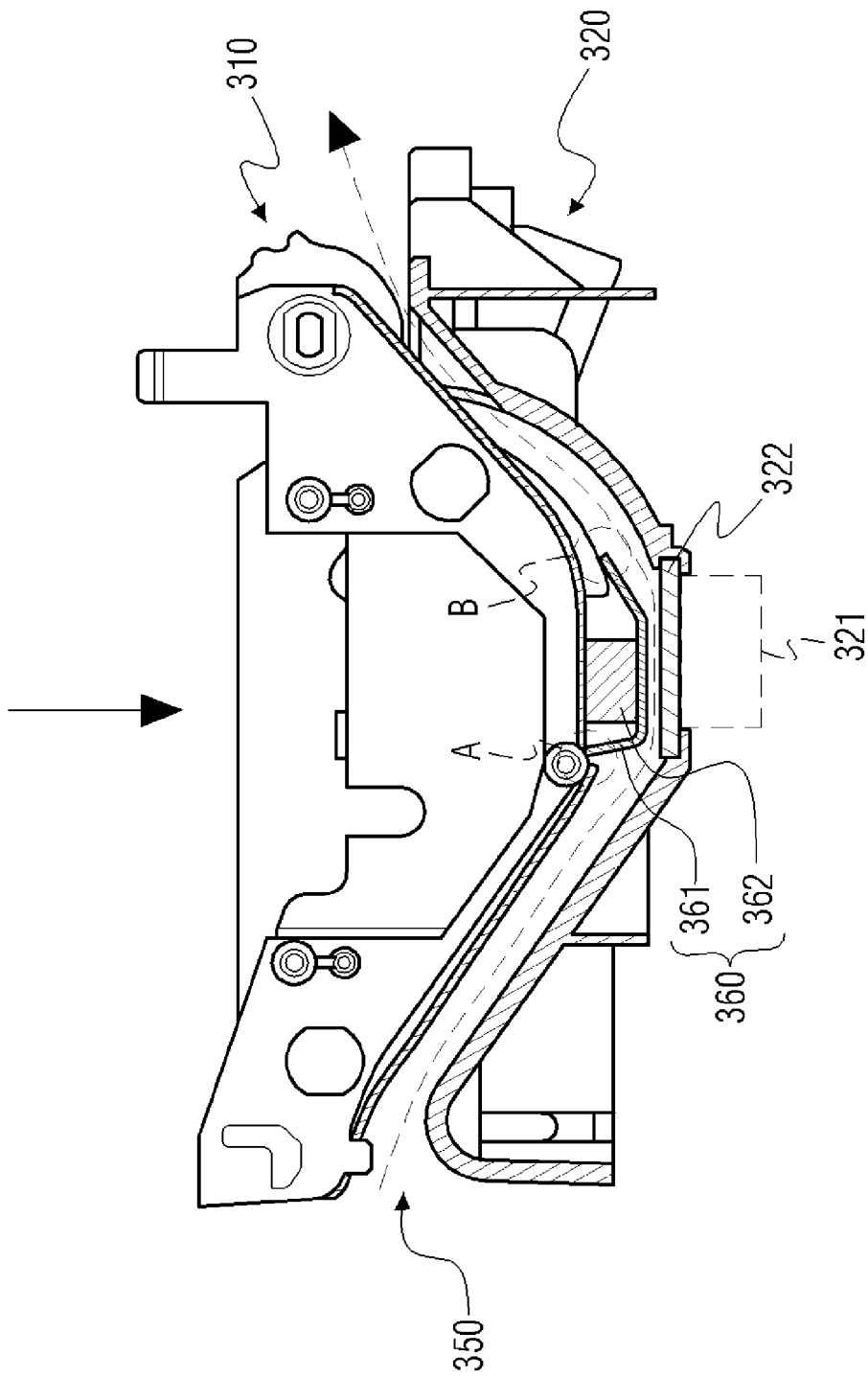
FIG. 3B is a schematic sectional view of the paper pressing device for a scanning apparatus when scanning according to the embodiment of the present invention.

FIG. 3B is a schematic sectional view of the paper pressing device 360 when scanning according to the embodiment of the present invention.

The paper pressing device 360 provided by the embodiment of the present invention is used in a scanning apparatus. The scanning apparatus has a first body 310 and a second body 320, and a paper track 350 is formed between the first body 310 and the second body 320. Generally, the first body 310 is the upper portion of the scanning apparatus and the second body 320 is the lower portion of the scanning apparatus, in which a scanning module 321 is disposed within the second body 320 corresponding to one side of the paper track 350, and a transparent plate 322 is disposed on the second body 320 corresponding to the scanning module 321. The transparent plate 322 is made of transparent materials such as glass or reinforced plastic.

The paper pressing device 360 includes a flexible film 361 and a pressing block 362.

The film 361 is disposed in the paper track 350 and on one side of the paper track 350 opposite to the scanning module 321. The width of the film 361 is approximately the same as that of the scanning module 321 and can also cover on the transparent plate 322 corresponding to the scanning module 321. The film 361 can be made of plastic materials such as polyvinyl chloride (PVC).

The pressing block 362 is disposed on one side of the film 361 opposite to the scanning module 321 and presses against the film 361 to reduce the height of the paper track 350 above the scanning module 321, so that the film 361 presses the paper sheets passing over the scanning module 321, onto the transparent plate 322.

The pressing block 362 is disposed on one side of the film 361. Furthermore, the pressing block 362 is covered by the film 361, and the width of the pressing block 362 is approximately the same as that of the scanning module 321. The pressing block 362 is used to provide a predetermined normal pressing force to the film 361, such that the film 361 can pressing the paper sheet flat onto the transparent plate 322 to be scanned by the scanning module 321. Therefore, it is acceptable that the pressing block 362 has a sufficient width to match with the scanning module 321. And, the thickness of the pressing block 362 is determined by the height of the paper track 350, such that the film 361 pressed by the pressing block 362 presses against the transparent plate 322 and the paper sheet passing over the transparent plate 322 is actually flattened, and meanwhile the pressing force is not too large to cause an unsmooth movement of paper sheets.

In order to make use of the film 361 to apply an appropriate pressing force to the moving paper, a better flattening effect can be achieved if the pressing block 362 is provided with a suitable elasticity. As such, an appropriate pressing force can be provided to press the paper sheet onto the transparent plate 322 to be scanned by the scanning module 321, and meanwhile the paper sheet can be driven by the paper feeding mechanism to move in the paper track 350. Therefore, the pressing block 362 can be made of an elastic material, such as foam, sponge, collodion, latex, and rubber.

During scanning, the film 361 is used to achieve a surface contact with the paper sheet, so as to precisely maintain the paper flat onto the transparent plate 322. Therefore, the optical conditions during the paper scanning process can be truly revealed, thus attaining an optimal image quality.

The left side edge of the film 361 is adjacent to an inlet end of the paper track 350, and is connected to the side of the paper track 350 opposite to the scanning module 321, wherein the portion of side of the paper track 350 where the film 361 connected to is recessed. Thus the side edge of the film 361 connected to the side of the paper track 350 does not protrude in the paper track 350 (as shown in the marked area A of FIG. 3A). The right edge of the film 361 is adjacent to the exit end of the paper track 350 (as shown in the marked area B of FIG. 3A), such that the front edge of the paper sheet does not contact the edge of the film 361 while the paper sheet entering the scanning area from the inlet for passing over the scanning module 321, thus avoiding paper jam. Further, a white color correction area can be arranged on one side of the film 361 corresponding to the scanning module 321, such that the film 361 has the function of a color reference slice serving as the reference of color correction for the scanning module 321, and the color reference slice is not required to be disposed in the scanning apparatus.

The paper pressing device in the prior arts has a poor paper flattening effect, such that the paper cannot be flattened onto the transparent plate to be scanned by a scanning module. However, the present invention can simplify the structure of the paper pressing device and flatten the paper onto the surface of the transparent plate to facilitate the scanning operation of the scanning module. Further, the present invention also has the function of a color reference slice, the whole structure of the scanning module can be simplified, thus effectively improving the scanning quality and also saving cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A paper pressing device for a scanning apparatus, the scanning apparatus including a scanning module and a paper track, wherein the paper track is disposed to correspond to the scanning module and allows a sheet of paper to pass through the paper track, the paper pressing device comprising:

a film disposed on one side of the paper track opposite to the scanning module, wherein a side of the film adjacent to an inlet end of the paper track is connected to a side of the paper track which is opposite to the scanning module, forming a gap between the side of the film and the side of the paper track, a white color correction area disposed on one side of the film in an area of the film corresponding to the scanning module, such that the film has the function of a color reference slice; and a pressing block disposed on one side of the film opposite to the scanning module and which presses against the film to reduce the height of the paper track above the scanning module.

2. The paper pressing device for a scanning apparatus as claimed in claim 1, wherein a transparent plate is further interposed between the scanning module and the film, and the film, pressed by the pressing block, is pressed against the transparent plate for pressing the paper.

3. The paper pressing device for a scanning apparatus as claimed in claim 1, wherein the pressing block is made of an elastic material.

4. The paper pressing device for a scanning apparatus as claimed in claim 1, wherein the material of the pressing block is selected from the group consisting of sponge, foam, collodion, latex, and rubber.

5. The paper pressing device for a scanning apparatus as claimed in claim 1, wherein the film is made of a plastic material.

6. The paper pressing device for a scanning apparatus as claimed in claim 5, wherein the plastic material is polyvinyl chloride (PVC).

* * * * *